(12) United States Patent
Kim et al.

(10) Patent No.: US 9,407,358 B2
(45) Date of Patent: Aug. 2, 2016

(54) OPTICAL NETWORK TERMINAL WITH FUNCTIONS OF DETECTING AND RECOVERING FROM FAILURES, BLOCKING SUPPLIED POWER, AND STORING INFORMATION, AND METHOD OF DETECTING CONTINUOUS OPTICAL OUTPUT USING THE SAME

(71) Applicant: UBIQUOSS Inc., Gyeonggi-do (KR)

(72) Inventors: Dae Hwan Kim, Seoul (KR); Sang Hern Lee, Seoul (KR)

(73) Assignee: UBIQUOSS INC. (KR)

( * ) Notice: Subject to any disclaimer, the term of this patent is extended or adjusted under 35 U.S.C. 154(b) by 0 days.

(21) Appl. No.: 14/463,210

(22) Filed: Aug. 19, 2014

(65) Prior Publication Data

US 2016/0056885 A1    Feb. 25, 2016

(51) Int. Cl.
| | |
|---|---|
| *H04B 10/08* | (2006.01) |
| *H04J 14/00* | (2006.01) |
| *H04B 17/00* | (2015.01) |
| *H04B 10/03* | (2013.01) |
| *H04B 10/27* | (2013.01) |

(52) U.S. Cl.
CPC ............... *H04B 10/03* (2013.01); *H04B 10/27* (2013.01)

(58) Field of Classification Search
CPC ............... H04B 10/03; H04B 10/272; H04Q 2011/0083; H04Q 11/0067
USPC .......................................... 398/7, 1
See application file for complete search history.

(56) References Cited

U.S. PATENT DOCUMENTS

| | | | | |
|---|---|---|---|---|
| 5,708,673 | A * | 1/1998 | Ikeuchi | H01S 5/042 372/29.01 |
| 6,108,112 | A * | 8/2000 | Touma | H04B 10/07 398/1 |
| 7,646,990 | B2 * | 1/2010 | Weber | H04B 10/0793 372/29.021 |
| 8,355,634 | B2 * | 1/2013 | Ota | H04B 10/0793 398/66 |
| 8,897,636 | B2 * | 11/2014 | Yoon | H04B 10/272 398/141 |
| 2004/0156635 | A1 * | 8/2004 | Felske | H04B 10/0779 398/66 |
| 2006/0093356 | A1 * | 5/2006 | Vereen | H04L 12/2602 398/33 |
| 2007/0237520 | A1 * | 10/2007 | DeLew | H04B 10/0799 398/17 |
| 2011/0033180 | A1 * | 2/2011 | Smith | H04B 10/272 398/1 |
| 2011/0044685 | A1 * | 2/2011 | Ota | H04B 10/0793 398/15 |

* cited by examiner

*Primary Examiner* — Oommen Jacob
(74) *Attorney, Agent, or Firm* — Levenfeld Pearlstein, LLC

(57) ABSTRACT

An optical network terminal with functions of detecting, recovering and blocking failures, and storing the information according to the present invention comprises: an uplink carrying out a function to communicate with a high level system; a communication port distributing or integrating the communication; a CPU managing distribution and integration of the communication; and a system power source for supplying power to the uplink, the communication port and the CPU, wherein the uplink comprises an optical module carrying out optical communication with the high level system; a MAC module controlling optical communication with the high level system; and a failure detection, recovery and blocking module for detecting optical output of the optical module, recovering failures and blocking optical output outside the MAC module. In accordance with the present invention, faster and specific failure solution can be provided using a low-cost microprocessor and its storage media.

13 Claims, 7 Drawing Sheets

OPTICAL NETWORK TERMINAL WITH FUNCTIONS OF DETECTING AND RECOVERING FROM FAILURES, BLOCKING SUPPLIED POWER, AND STORING INFORMATION, AND METHOD OF DETECTING CONTINUOUS OPTICAL OUTPUT USING THE SAME

BACKGROUND OF THE INVENTION

1. Technical Field

The present invention relates generally to an optical network termination having the function of: detecting and recovering from failures, blocking supplied power, and storing information. More particularly, the present invention relates to an optical network termination system functioning to detect any abnormal optical output using only a microprocessor installed on an uplink, to perform recovery from an abnormality, to block power to an optical module, to store information in a storage medium and to display the information on an external device when a continuous optical output of an optical module is generated to cause an Optical Network Terminal (hereinafter referred to as ONT) to obstruct internet services for another ONT.

Also, the present invention relates to a method for the detection of continuous optical output, the recovery from failures, and the blockage of continuous optical output. More particularly, the present invention relates to a method for detecting a continuous optical output using a failure detection/recovery/blockage microprocessor which functions to determine that an optical module is operating normally when recognizing a section where detected signals of a continuous optical monitor diode (mPD) have a low value for a predetermined time period, or can reset or block the optical module when an abnormal continuous optical output state having high values is detected.

2. Description of the Related Art

In general, a Passive Optical Network (hereinafter referred to as "PON") consists of one Optical Line Termination (hereinafter referred to as "OLT") at the service provider's central office and a number of Optical Network Terminals or Optical Network Units (hereinafter referred to as ONTs) near end users. In this PON, a number of ONTs may transmit optical signals to the OLT, that is, may transmit uplink data only for a period of time that is allocated to them.

If at least one of the ONTs transmits optical signals to the OLT other than at or beyond a time period allocated to it, a collision is highly likely to occur due to simultaneous optical signal transmission of other ONTs, causing communication failure of the entire network.

Below, a description will be given of an situation in a conventional art where one ONT has a failure that may result in a subsequent failure of the entire network.

As illustrated in FIG. 1a, a PON system 2 is a telecommunication network in which a optical subscriber network is constructed to provide optical network-based high-speed communication services to corporate or home users, thus allowing for access to multiple ONTs 30-1 through 30-n with one OLT 10 using a passive optical device, splitter 20.

PON system 2 includes TDM-PON using a Time Division Multiplexing (TDM) protocol and WDM-PON using a Wavelength Division Multiplexing (WDM) protocol. A PON system 10 of a Time Division Multiplexing method includes ATM-PON using Asynchronous Transfer Mode (ATM). Ethernet-based E-PON, G-PON using common frame protocol, etc.

The PON system 2 using a Time Division Multiplexing protocol operates as described below. In a downstream direction in which data is transferred from an OLT 10 to ONTs 30-1 through 30-n, the OLT 10 inserts and sends registered identifiers of ONTs 30-1 through 30-n into a preamble of frames and ONTs 30-1 through 30-n receive only those frames having their own identifiers. However, as illustrated in FIG. 1b, in an upstream direction in which data is transferred from ONTs 30-1 through 30-n to OLT 10, OLT 10 allocates time slots of an upstream transmission process to all of the ONTs 30-1 through 30-n, and individual ONTs 30-1 through 30-n may transmit data to OLT 10 only for the respective time slot allocated to each of them individually.

In the upstream process mentioned above, as illustrated in FIG. 1c, when an ONT 10 has a defect of causing a laser diode to be in a constantly illuminated state, there could be a problem that as the defective ONT 30-1 blocks the subsequent time slots of the upstream process, it not only prevents a plurality of other ONT 30-2 through 30-n from sending data to the OLT 10, but also causes the OLT 10 to determine that ONT 30-2 through 30-n, having no defects, are not functioning properly.

Accordingly, the present invention intends to allow streamlined operation of the PON system 2 via the early detection of a constantly illuminated state of a laser diode of a defective ONT 30, and shutting down the optical module of the defective ONT 30.

The ONT 30 may include an optical transmitter module 32, an optical receiver module 34, and a control unit 36.

The optical transmitter module 32 sends optical signals to the OLT 10 according to the orders of the control unit 36. The optical transmitter module 32 may consist of a laser diode, emitting optical signals, and a laser driver unit to drive the laser diode. The optical receiver module 34 receives optical signals from the OLT 10. The optical receiver module 34 can be implemented as a module together with the optical transmitter module 32. The control unit 36 is able to carry out a function to disconnect the optical transmitter module 32 according to the order of suspending optical signals from the OLT 10.

OLT 10 may include an optical transmitter module 12, an optical receiver module 14, and a control unit 36.

An optical transmitter module 12 receives optical signals from multiple ONUs 30. The optical transmitter module 12 may include a photodiode for receiving optical signals and converting them into electrical signals and an amplifier for amplifying the converted signals. A control unit 36 provides transmitted data and photoactive signals to the optical transmitter module 12 or receives and processes photoelectric-converted data of optical signals received from the optical receiver module 14 and generally controls the OLT 10.

A control unit 36 may further include a Received Signal Strength Indicator (hereinafter referred to as RSSI) 16a and a failure determination unit 16b.

RSSI 16a detects received signal strength of the received optical signals. A failure determination unit 16b determines if the ONT 30-1 is in an abnormal state. The failure determination unit 16b compares an optical power level detected by RSSI 16a with a reference value and determines that ONT 30-1 is in a normal state if the optical power level does not exceed the reference value, or is in an abnormal state if the optical power level exceeds the reference value.

Here, if the optical power level is assumed to be a set of optical signal strengths of individual ONTs 30-1 through 30-n that share the same optical cable with the OLT 10, the reference value refers to an optical power level generated when an optical transmitter module 32 is in an illuminated state from one normal ONT 30-2. In other words, in a normal state, a received optical power level is maintained equivalently if ONT 30-1 has no defect, but the received optical power level increases to exceed the reference value due to a constant illumination of the abnormal ONT 30-1 when the ONT 30-1 has a defect.

When the failure determination unit 16b detects a failure, it transmits a failure message to the ONT 30-1 via the optical transmitter module 12 to resolve the failure. In addition, the individual ONTs 30 corresponding to it include a Transmitted Signal Strength Indicator (hereinafter referred to as TSSI).

As mentioned above, optical modules that indicate continuous optical output status through TSSI signals have been introduced, but the equipment installed on the high and low level systems is expensive and causes a total cost increase. In addition, conventional optical modules only store the number of failures or simply block the failures without any recovery attempt. Since they have no function of storing other types of failures such as the hang-up of a PON MAC chip, excessive voltage application, etc., it is not possible to identify causes of failures and it is difficult to quickly remedy failures.

SUMMARY OF THE INVENTION

Accordingly, the present invention has been made for solving the above problems occurring in the conventional art, and an object of the present invention is to provide an optical network terminal for automatically detecting major causes of failures such as abnormal continuous optical output, the hang-up of a PON MAC chip, errors caused by configuration settings of the terminal, etc.; and attempting recovery or permanently blocking failures if the failures are not resolved so that they do not disrupt the entire internet network.

Another object of the present invention is to provide an optical network terminal for identifying its installation environment and operation practices by storing the number of times excessive voltage is applied to the terminal, power-ons/offs, abnormal continuous optical outputs, hang-ups of PON MAC chips, initializations of configuration settings, etc., and for satisfying customer needs with faster failure detection, resolution and fault recovery.

In accordance with an aspect of the present invention in order to achieve the said objectives, the present invention includes an uplink to carry out communication functions with high level systems; a communication port to distribute or integrate the communication; a CPU to manage distribution and integration of the communication; and a system power to supply power for the uplink, the communication port, and the CPU; where the uplink includes: an optical module, a MAC module to control optical communication with the high level systems, and a module to detect optical output, recover failures and block optical outputs of the optical module outside the MAC module.

As described above, in accordance with configurations of the present invention, the following effects are expected:

First, the present invention provides economic efficiency, because it is possible to solve failures of optical network terminals using a low price microprocessor dedicated to detect, recover and block failures without the use of expensive equipment such as RSSI or TSSI.

Second, fast and appropriate recovery is provided, since failure information including the number of continuous abnormal optical outputs, hang-ups of MAC modules, excess voltage applied to the optical network terminal, etc. is stored using an internal or external storage media of a microprocessor.

Third, failure detection time and recovery costs can be remarkably reduced, since even with OLT equipment that does not support an RSSI function, installing only a microprocessor in the ONT equipment and changing software allows for a continuous optical output status to be easily detected.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The benefits, features and methods of achieving the same of the present invention will be clarified with reference to embodiments to be described in detail below with reference to the attached drawings. However, it should be understood that those embodiments are not intended to limit the present invention to specific disclosure forms, but they will be realized as various different forms, provided for complementing embodiments of the present invention and fully informing those with common knowledge in the art of the present invention of a category of the present invention and defined by scopes of claims of the present invention. Sizes and relative sizes of layers and areas in drawings may be exaggerated for clear explanation. Any and all of same reference symbols throughout the specifications refer to the same elements.

Preferable embodiments of an optical communication terminal having the function of a PON system with functions of detecting, recovery and blocking failures and storing the information according to the present invention that has configurations as mentioned above will be described in detail below with reference to the attached drawings.

In a common PON system, when there is any failure occurring on a PON MAC chip carrying out communication of a terminal or an optical module and an LED continuously emit light, every optical network terminal connected to the same optical cable goes into a failure resulting in disruption of internet services.

Optical network terminals being in service today have no function in detecting a continuous optical output status, and therefore the present invention intends to allow operators and users to easily find a terminal causing failures and solve the failures in order to solve the problem that every other terminal connected to an optical cable cannot provide internet services due to the failure of a single terminal.

Figure 1A:
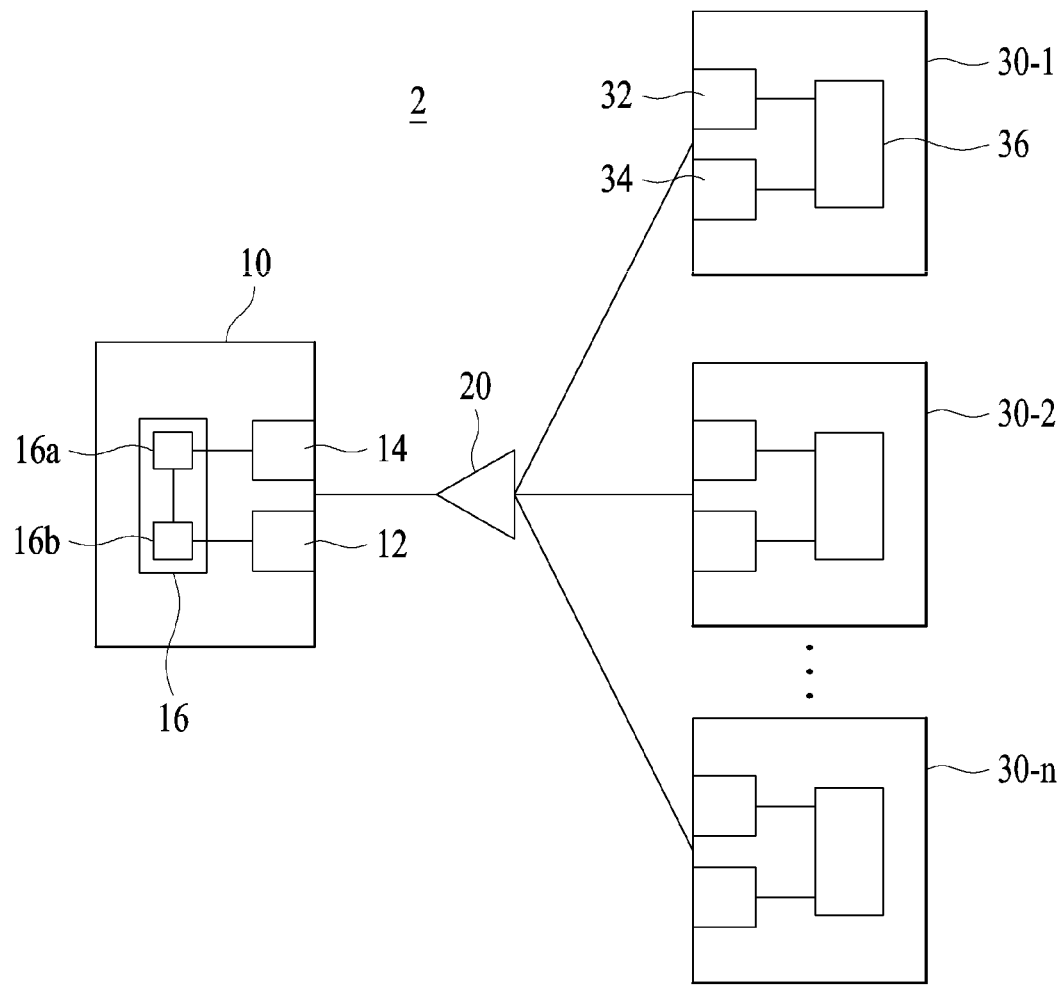
FIG. 1a-FIG. 1c are block diagrams illustrating the composition and functions of a PON system according to a conventional art.
Figure 1B:
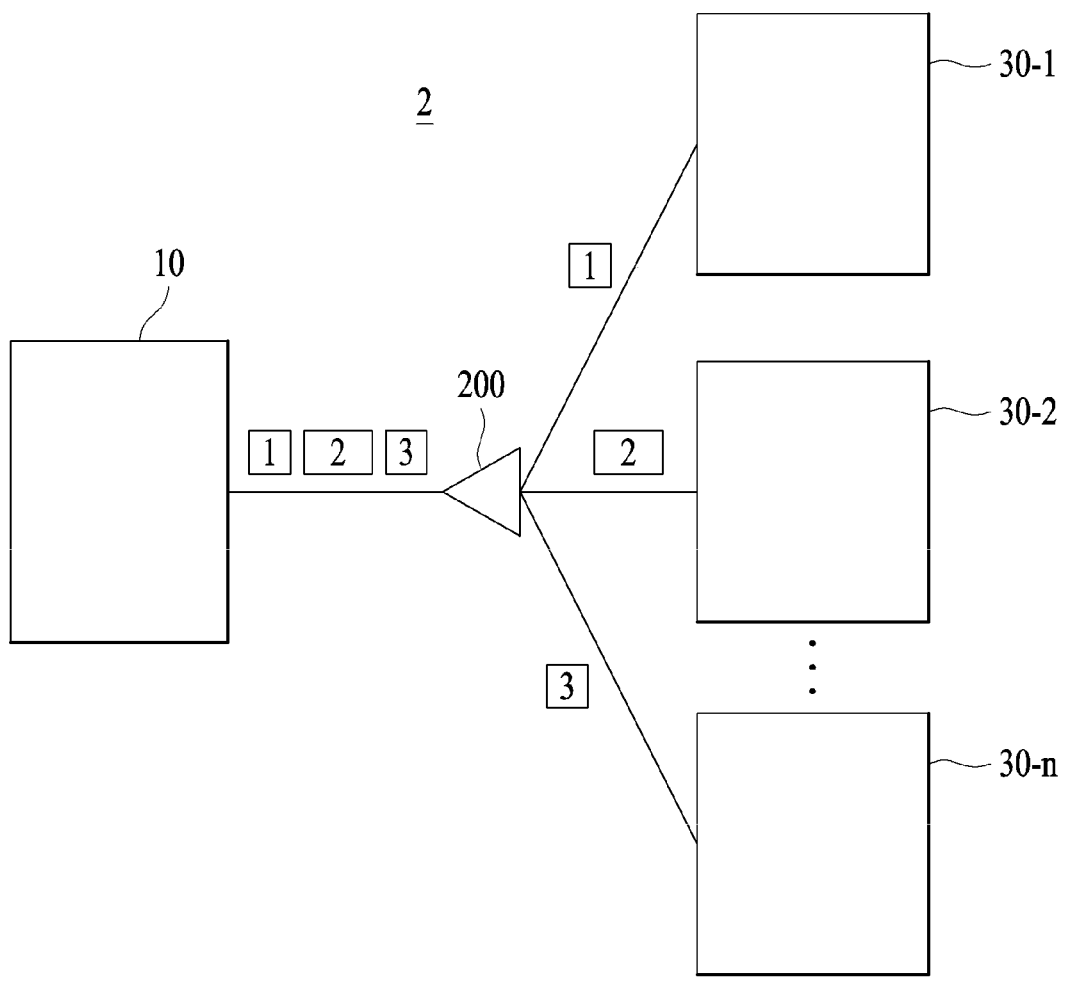
Figure 1C:
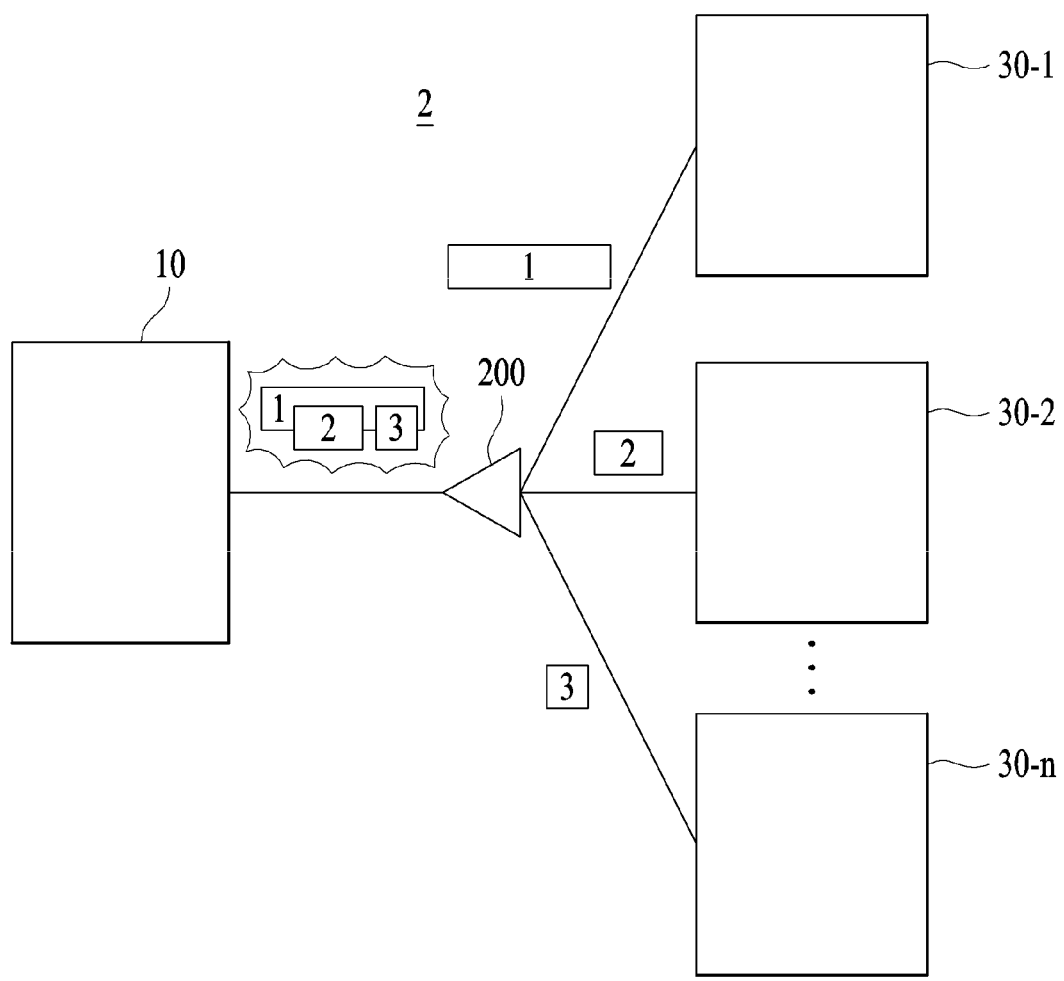
Figure 2:
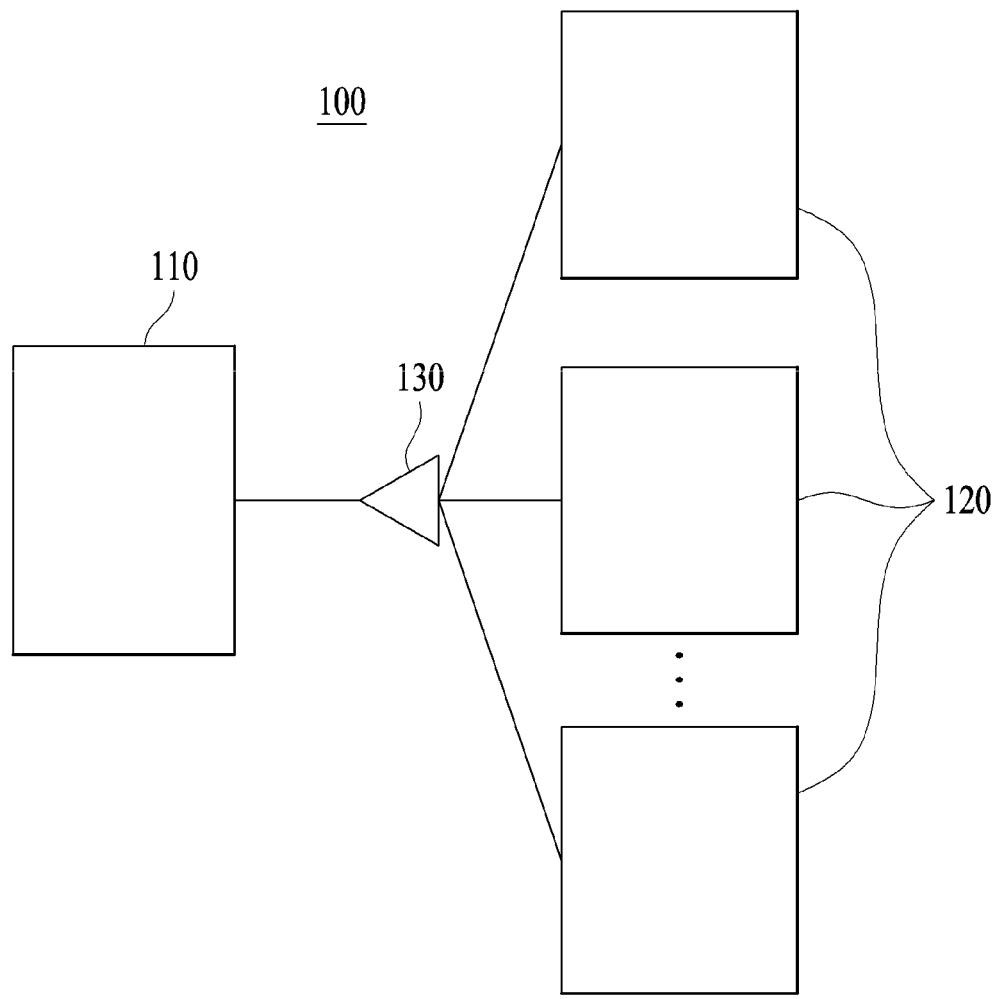
FIG. 2 is a block diagram illustrating the composition of a PON system according to an embodiment of the present invention.

As illustrated in FIG. 2, a PON system 100 according to the present invention includes an Optical Line Termination (hereinafter referred to as ONT) 110 corresponding to a high level system, multiple Optical Network Terminals or Optical Network Units (hereinafter referred to as ONTs) 120, and an Optical Distribution Network (hereinafter referred to as ODN) 130 to allow one OLT 110 to connect to the multiple ONTs 120.

A PON system 100 has a structure using a manual distributor or a wavelength division multiplexing device between subscriber access nodes such as FTTH network (Fiber To The Home) or FTTC network (Fiber To The Curb), etc. and network terminals, and the nodes may construct a bus or tree pattern network. A PON system 100 according to the present invention may have a shape of APON (ATM: Asynchronous Transfer Mode, PON), EPON (Ethernet PON) or GPON (Gigabit PON).

In accordance with embodiments of the present invention, the PON system 100 can be interpreted with a broad meaning including an HFC network, rather than being limited to just the FTTH network. For example, using an HFC (Hybrid Fiber Coaxial) network to carry out CATV broadcasting and provision of internet services allows broadcasting streams and data to be transmitted from head-ends (H/E) of high level systems to modems of wired subscribers corresponding to low level systems.

Figure 3:
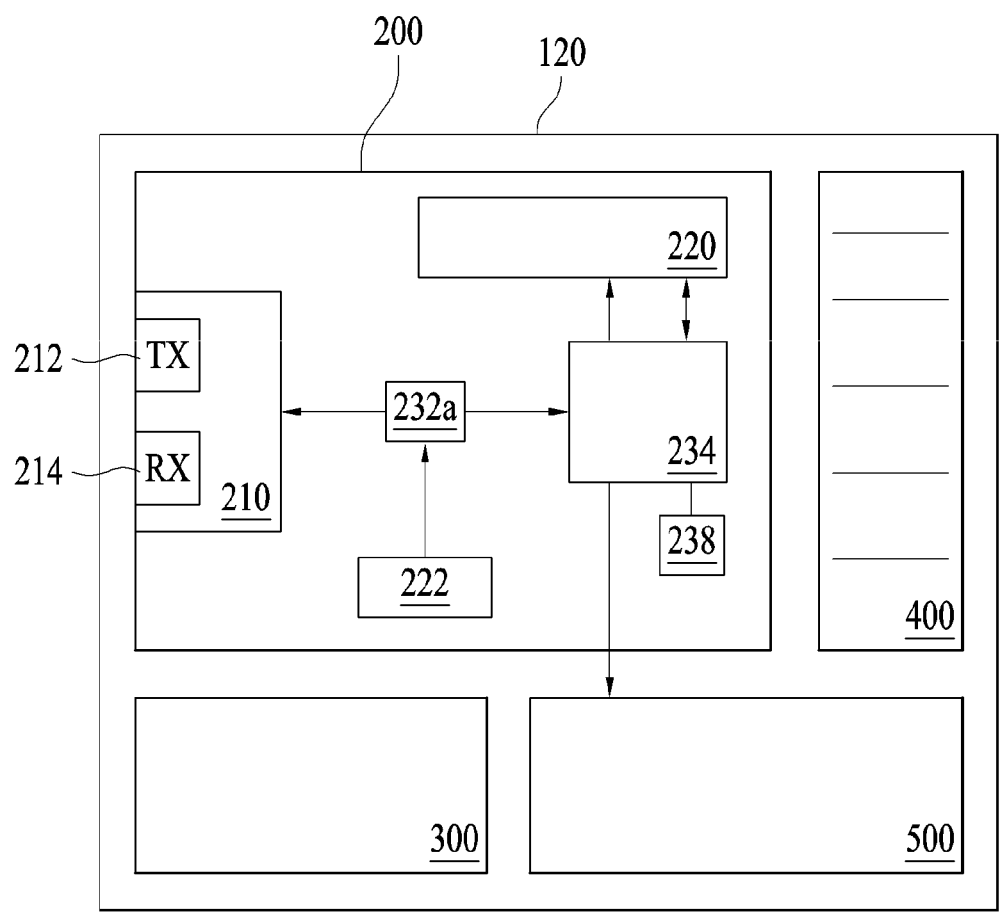
FIG. 3 is a block diagram illustrating the composition of an optical network terminal according to the present invention.

As illustrated in FIG. 3, an ONT 120 may include an uplink 200, a CPU 300, a communication port 400, and a system power 500.

An uplink 200 is responsible for a communication function with a high level system, OLT 110.

A CPU 300 manages distribution and integration of communication. For example, it is responsible, as the central processing unit of the ONT 120, for management and control of each module within the ONT 120, and handles data transmission time control for network status management and communication in conjugation with OLT 110, a higher system of a PON system 100).

A communication port 400 distributes or integrates the communication according to control commands from the CPU 300. For example, it is intended to implement a wired Ethernet access to individual offices or homes for connecting Ethernet cables to offices or homes (or each desk or each room). The communication port 400 may be configured with 2, 4 or 8 aggregated ports.

A system power 500 supplies power to the ONT 120. That is, it uses several adaptors for supplying power to an uplink 200, a communication port 400 and a CPU 400. Particularly, it carries out a function of turning off/on power according to signals (e.g. a power initialization signal) from a microprocessor which will be described below.

An uplink 200 includes an optical module 210 to carry out optical communication with the OLT 110, a MAC module 220 to control optical communication with the OLT 110, and a failure detection, recovery and blocking module 230 to detect optical output of the optical module 210 independently from the MAC module 220, recover failures and block optical output.

An optical module 210 carries out optical communication using an optical transmission (TX) power 212 and an optical reception (RX) power 214. The optical transmission (TX) power 212 carries out E/O conversion from electric signals into optical signals. The optical reception (RX) power 214 carries out O/F conversion from optical signals into electric signals.

A MAC module 220 manages optical outputs of the optical module 210 for controlling optical communication. For example, when an individual ONT 120 makes data communication with the OLT 110, it may allocate a time slot for upstream transmission to avoid duplication of upward flowing data.

A failure detection, recovery and blocking module 230 may include a failure detection, recovery and blocking microprocessor 234 for determining operation status of the optical module 210 using output voltages of a voltage sensor resistor 232a and a voltage sensor resistor 232a connected to the optical module 210. For example, output voltage of the voltage sensor resistor 232a may be connected and output to an ADC pin of the failure detection, recovery and blocking module 230.

An uplink 200 includes a power control logic module 222 to be installed inside or outside the MAC module 220, or it may be embedded in the CPU 300 outside the uplink 200 to control the power supply to the optical module 210.

A power control logic module 222 controls the current applied to the TX power 212 and RX power 214 using a circuit. When a predetermined current (e.g. 100 mA) is applied from the power control logic module 222 to the TX power 212, there is no change to a sensor output voltage in a normal state, but when the current applied to the TX power 212 increases (i.e. 200 mA), a voltage drop occurs by means of the voltage sensor resistor 232a and the sensor output voltage changes due to an increased current with a constant resistance value.

When the microprocessor 234 measures a low sensor output voltage, it may identify a continuous optical output status and control the power control logic module 222 to reset the optical module 210. In order to recover from a continuous optical output status, microprocessor 234 controls the power control logic module 222 for resetting the TX power 212. If failure of the optical module 210 is not recovered and occurs repeatedly within a predetermined interval and continuous optical power continues despite the resetting (Off/On) of the optical module 210, it is possible to permanently shut down TX power of the optical module 210 so as to fundamentally block failures.

At this time, an LED display device (not shown) may be installed on the respective uplink 200 indicating permanent blocking of the optical module 210 for fast recovery. For example, the display device may be installed outside the uplink 200 of the PON system 100 or outside the ONT 120.

The Second Embodiment

Functions of Detecting, Resetting and Shutting Off a Hung-Up MAC Module

In an L2 switch or an ONT 20 being located at a subscriber side as a low level system of the PON system 100, functions of the MAC module 220 may be hung up due to a defective internal switch (S/W) or external environmental factors. When the MAC module 220 is hung up, subscriber services becomes unavailable.

One of the causes of optical network terminal failure according to the present invention is the MAC module 220 becoming hung-up. The serial interface between the MAC module 220 and microprocessor 234 (e.g. UART, I2C, etc.) enables a hung-up status to be detected. When a hang-up is detected, the microprocessor 234 is able to recover from the failure with a hardware reset or to permanently block the failure by turning Off/On of the system power 500.

For example, the microprocessor 234 may detect a that the MAC module 220 is hung-up through a UART interface (I/F) and carry out report and management functions when a hang-up occurs.

At this time, initialization or rebooting status of power Off/On may be indicated with an LED display device 210 for fast recovery.

The Third Embodiment

Error Determination and Initialization of Configuration Settings of an Optical Network Terminal An optical network terminal can not connect optical links nor provide internet services if configuration settings are incorrect. The microprocessor 234 detects that there are optical signals with a loss of signal (LOS) warning from the optical module 210, initializes configuration settings of the MAC module 220 through a serial interface, and carries out a hardware reset of the terminal.

The Forth Embodiment

Excessive Voltage Detecting Function

The microprocessor 234 recognizes the application of excessive voltage when an ADC value becomes higher than a predetermined value and indicates the state of the LED by measuring voltage level of input voltage to the optical network terminal through ADC pins.

When DC voltage applied to the terminal becomes higher than an operation voltage of the terminal, it is determined to be excessive voltage and the system power is turned off. If DC voltage level applied to the TX power 212 and the RX power 214 of the optical module 214 becomes higher than operation voltage of the optical module 210, it is also determined to be excessive voltage and the TX power 212 and the RX power 214 of the optical module 214 are turned off.

Accordingly, measuring an excessive voltage status of the terminal using the microprocessor 234 dedicated to detect, recover and block failures according to the present invention enables simple detection and correction of the failures at the terminal level.

The Fifth Embodiment

A Function of Detecting Power-Off and Power Failure

The microprocessor 234 recognizes power failure and power-off status of the system power 500 when ADC value becomes lower than a predetermined value by measuring voltage level of input voltage to the ONT 120 through ADC pins, and sends a power fail signal to the MAC module 220 for sending a Dying GASP message.

The Sixth Embodiment

A Remote Reset Function

The MAC module 220 interprets remote reset commands through OAM messages, connects its GPIO pins to the microprocessor 234. The microprocessor 234 carries out a hardware reset or power-Off/On according to signals from the connected GPIO pins.

The Seventh Embodiment

Storage of the Type and Number of Occurrences of Failure

Failures and their main causes of the optical network terminal, i.e. ONT 120 are detected by the microprocessor 234, which stores the number of occurrences into an internal or external flash memory device, DDR, EEPROM, or other storage media 238. This allows for faster cause analysis and repair upon repair requests from the users and service quality is improved by eliminating causes of failures through analysis of installation environments.

As mentioned above, causes and items of failures to be stored in the storage media 238 include:
- (a) The number of continuous abnormal optical outputs;
- (b) The number of hang-ups of the MAC module;
- (c) The number of excessive voltage applications to the optical network terminal;
- (d) The number of power-ons/offs/;
- (e) The number of configuration setting initializations; and
- (f) The number of remote resets.

As mentioned above, the functions of detecting, attempting recovery and blocking failures of the optical network terminal for preventing failures on the internet network if the failures are not recovered, using a low price microprocessor 234 according to the present invention are presented.

In addition, identifying and analyzing environments where the optical network terminal is installed and operation habits of the users accessing the optical network terminal by storing the causes and the number of failures, allow provider credibility to be increased on the part of the customer through faster failure recovery and repair.

The Eighth Embodiment

A Function of Detecting Continuous Optical Output

Figure 4:
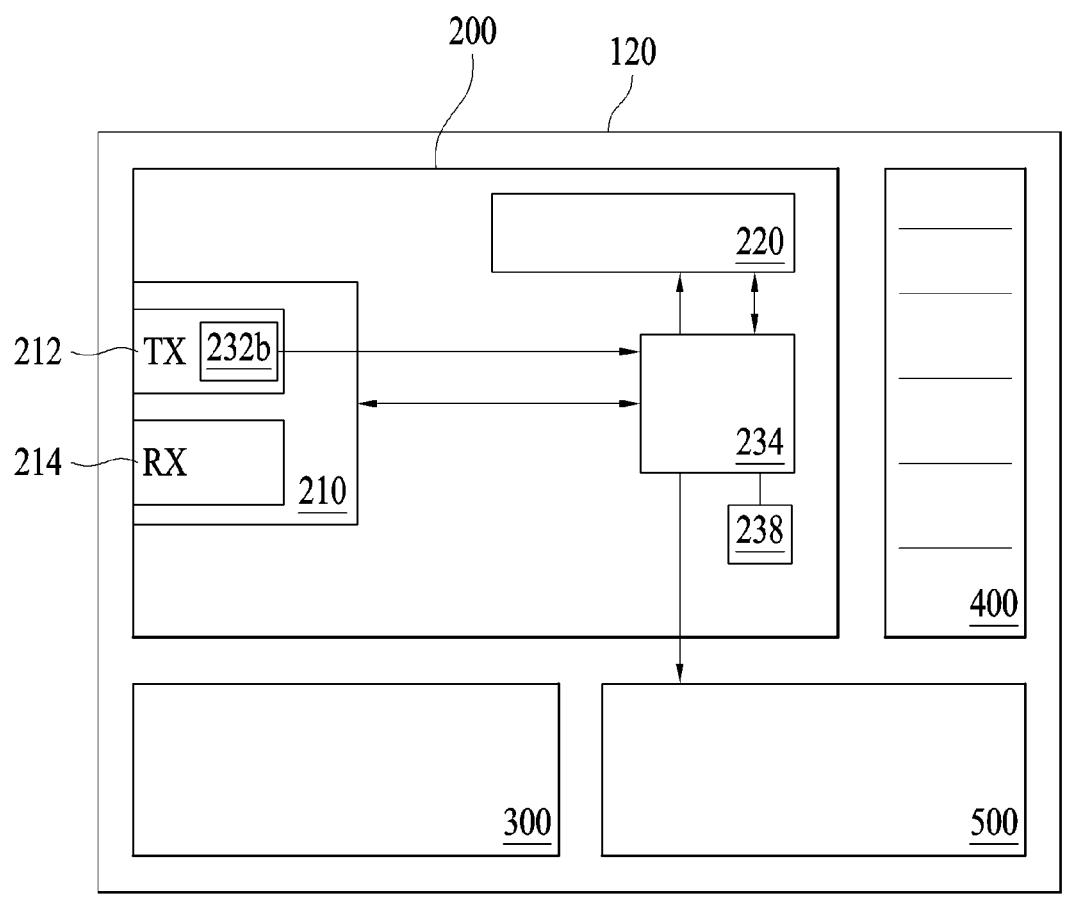
FIG. 4 is a block diagram illustrating the composition of a PON system according to another embodiment of the present invention.

With reference to FIG. 4, the failure detection, recovery and blocking module 230 in accordance with an embodiment of the present invention may include a continuous optical monitor photodiode 232b that is installed on one side of the TX power 212 and receives optical signals of an optical transmission laser diode (not shown) and a failure detection, recovery and blocking microprocessor 234 for determining continuous optical output of the optical module 210 using phase-modulated detection signals of a detection currents from the continuous optical monitor photodiode 232b.

The failure detection, recovery and blocking microprocessor 234 is able to output detection signals at a high level if a level of detection current increases beyond a predetermined value, determine a continuous optical output status, and take required measures such as blocking of the TX power 212, etc. if the high level signals continue for more than an allocated period of time.

At this time, as described in the first embodiment, it is possible to control a current applied to the TX power 212 with a circuit using the power control logic module 222, and reset or permanently block the optical module for recovering the continuous optical output status. It is also possible to indicate the power blocking status externally using a display device.

Figure 5:
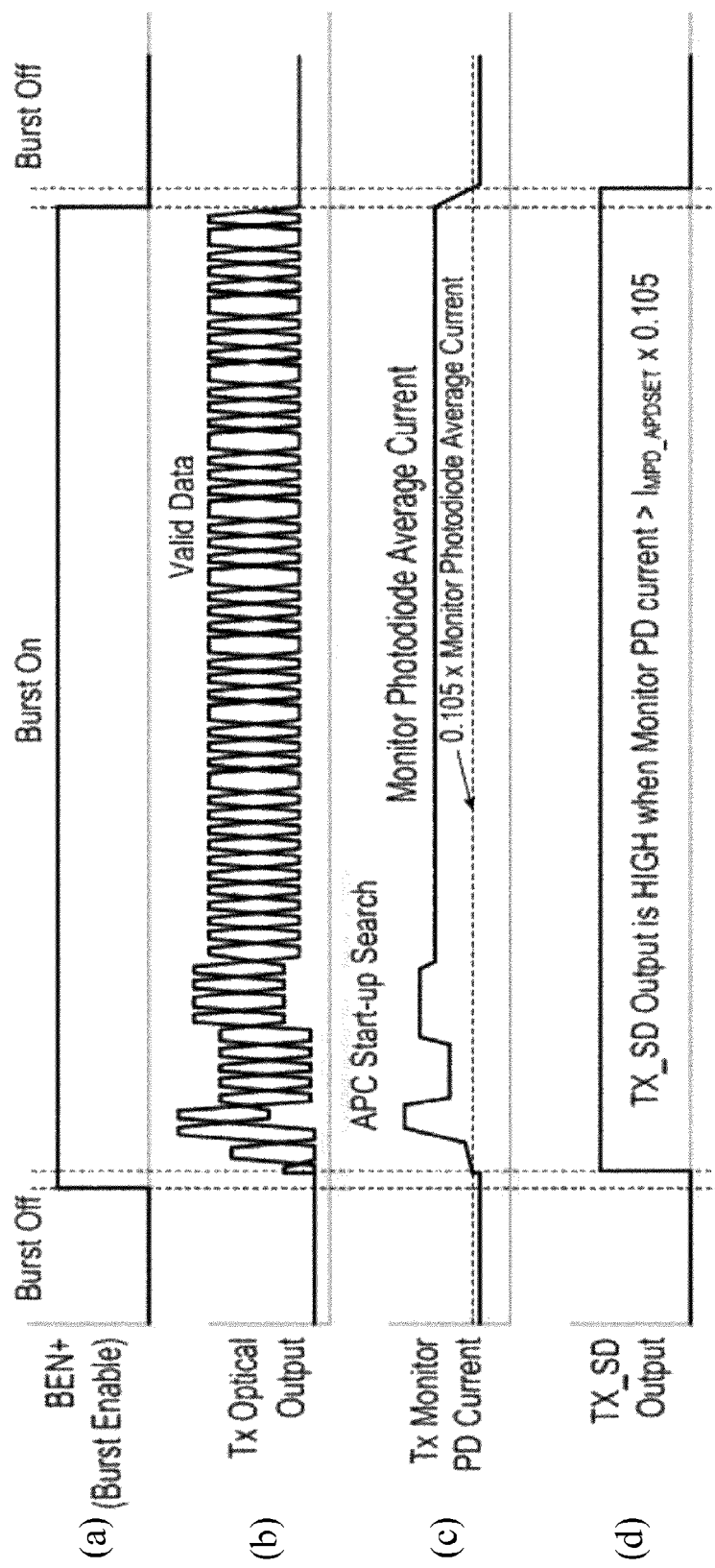
FIG. 5 is a timing diagram of detecting continuous optical output according to an embodiment of the present invention.

With reference to FIG. 5, the MAC module outputs burst-enabled signals, which are output at a high level during the transmission of a section of data to be sent from the ONT 120 to the OLT 110 according to control signals of the MAC module 220. The optical module 220 in a normal state is able to send data only for a time allocated by the OLT 110, but cannot send data at other times.

For example, burst-enabled signals are output in a burst-on format from the MAC module 220 to a laser driver (not shown) according to data time division multiplexing protocols and a bias voltage is applied from the laser driver (not shown) to a laser diode not shown) cause the laser diode to illuminate.

Since the optical module 210 is able to carry out optical communication only for an allocated period of time using the optical transmission (TX) power 212 and transmit optical signals (TX Optical Output), the continuous optical monitor photodiode 232b can receive the optical signals. Thus, the continuous optical monitor photodiode 232b outputs a detection current (TX Monitor PD Current) and the microprocessor 234 is able to check the phase-modulated detection signals (TX_SD Output) based thereon.

On the contrary, since it can not carry out optical communication during any other time period using the optical transmission (TX) power 212, nor send the optical signals (TX Optical Output), the monitor photodiode (mPD) which detects optical signals cannot receive the optical signals. Therefore, the continuous optical monitor photodiode 232b cannot provide the detection current (TX Monitor PD Current) nor confirm the detection current (TX Monitor PD Current) output based thereon.

When the optical module 210 is in a continuous optical output state due to a malfunction, it outputs optical signals regardless of burst-enabled signals of the MAC module 220, and the level of detection current received by the continuous optical monitor photodiode 232b continues at a higher level than a predetermined value, which causes detection signals to be output continuously at a high level.

Accordingly, the microprocessor 234 determines that the optical module 210 operates normally if there is a section where the detection signals (TX_SD Output) have a low level for a predetermined period of time, and it determines that the optical module 210 has a failure with continuous optical output and thus blocks the TX power 212 so there is no section where the detection signals have a low level for the predetermined period of time.

For an instance, when the optical module 210 is supplied with power and correct average current level is found during an initialization process, and the detection current exceeds 0.105 times of an average current level, output of the detection signals (TX_SD Output) is high.

A method of detecting, recovering and blocking a continuous optical output of the optical network terminal according to the present invention is described below with reference to FIG. 5.

(a) As illustrated in a timing diagram of burst-enabled signals, burst-enabled signals are output in a form of burst-on/off from the MAC module 220 to the Laser Driver.

(b) As illustrated in a timing diagram of optical signals, when a bias voltage is applied to the laser diode from the laser driver, optical signals are output in a form of valid data due illumination of the laser diode.

(c) As illustrated in a timing diagram of a detection current, when the laser diode illuminates, the continuous optical monitor photodiode 232b receives the optical signals and provides the detection current in the form of start-up by Automatic Phase Control.

(d) As illustrated in a timing diagram of detection signals, if a level of the detection current exceeds a predetermined value of the Monitor Photodiode Average Current, the continuous optical monitor photodiode 232b outputs the detection signals in a high level or a low level if it is less than the predetermined value.

As described above, a method to recognize a low level of the detection signals includes a polling process and an interrupt process.

For example, with the polling process, if a burst-on section is polled in a predetermined cycle, the detection signals are maintained at a high level regardless of the predetermined cycle and the microprocessor 234 cannot detect a low level, it may be determined that there is an abnormal continuous optical output.

If the optical module 210 includes an optical module transmitting 1 Giga bits, a predetermined cycle is long enough to easily detect a section declining from a high state to a low state, but if it includes an optical module transmitting over 10 Giga bits, the predetermined cycle is short and the section cannot be easily identified. In order to facilitate identification thereof, an interrupt process may be used for easily identifying a low level of the detection signal. According to the interrupt process, since a burst-on section is processed with an interrupt, detection signals keep the high level regardless of the interrupt and the microprocessor 234 can not recognize a low level of the detection signal, it may be determined that there is an abnormal continuous optical output.

As described above, it is understood that the present invention specifies composition of an optical network terminal with unique functions of detecting, recovering and blocking failures and storing the information, a method of detecting a continuous optical output using the same as its technical spirit. There would be many different modifications available for those with common knowledge in this industry, within the scope of basic technical spirits of the present invention.

| Description of Symbols | | | |
|---|---|---|---|
| 100: | PON System | 110: | OLT |
| 120: | ONT | 130: | ODN |
| 200: | Uplink | 210: | Optical Module |
| 212: | TX Power | 214: | RX Power |
| 220: | MAC Module | 222: | Power Control Logic Module |
| 230: | Failure Detection, Recovery and Blocking Module | | |
| 232a: | Voltage Sensor Resister | | |
| 232b: | Continuous Optical Monitor Photo Diode | | |
| 234: | Microprocessor | 238: | Storage Media |
| 300: | CPU | 400: | Communcation Port |
| 500: | System Power | | |

What is claimed is:

1. An optical network terminal having functions of failure detection/recovery/blockage, and information storage, the optical network terminal comprising:
an uplink responsible for communication with a high-level system;
a communication port for distributing or integrating the communication;
a CPU for managing distribution and integration of the communication; and
a system power source for supplying power to the uplink, the communication port and the CPU, wherein the uplink comprises:
an optical module for performing optical communication with the high-level system;
an MAC module for controlling optical communication with the high-level system; and
a failure detection/recovery/blockage module for detecting optical output of the optical module, providing recovery from failures and blocking optical output of the optical module outside of the MAC module, wherein the failure detection/, recovery/blockage module includes a failure detection/recovery/blockage microprocessor carrying out a serial interface with the MAC module, said microprocessor functioning to detect a hang-up state of the MAC module through the serial interface.

2. The optical network terminal of claim 1, wherein the microprocessor carries out initialization and permanently blocks system power source by controlling the MAC module with hardware when detecting the hang-up state.

3. The optical network terminal of claim 2, wherein the microprocessor initializes configuration settings of the MAC module through the serial interface when determining that an optical link is not connected for a specified period of time through LOS signals of the optical module.

4. The optical network terminal of claim 3, wherein the microprocessor determines and displays excessive voltage state on an LED device when detecting a voltage level of the optical module higher than a specified value.

5. The optical network terminal of claim 4, wherein the microprocessor further comprises an internal or external storage medium, said storage medium being configured to store information on a number of initializations and a number of actions required to block the system power source.

6. The optical network terminal of claim 5, wherein the storage medium stores:
   information on a number of hang-ups of the MAC module;
   information on a number of initializations of the configuration settings; and
   information on a number of occurrences of voltage excesses.

7. An optical network terminal having functions of failure detection/recovery/blockage, and information storage, the optical network terminal comprising:
   an uplink responsible for communication with a high-level system;
   a communication port for distributing or integrating the communication;
   a CPU for managing distribution and integration of the communication; and
   a system power source for supplying power to the uplink, the communication port and the CPU, wherein the uplink comprises:
   an optical module for performing optical communication with the high-level system;
   an MAC module for controlling optical communication with the high-level system; and
   a failure detection/recovery/blockage module for detecting optical output of the optical module, providing recovery from failures and blocking optical output of the optical module outside of the MAC module, wherein:
   the optical module carries out uplink and downlink optical communication using optical transmission (TX) power and optical reception (RX) power; and,
   the failure detection/recovery/blockage module includes:
   a continuous optical monitor photodiode for receiving optical signals of the TX power and releasing detection signals; and
   a failure detection/recovery/blockage microprocessor for determining continuous optical output of the TX power by use of detection signals of the continuous optical monitor photodiode.

8. The optical network terminal of claim 7, wherein
   the continuous optical monitor photodiode provides a detection current proportional to the optical signals by releasing the detection signals as high values when the detection current has a level exceeding a predetermined value, or as low values when the detection current has a level not exceeding the predetermined value; and
   the failure detection/recovery/blockage microprocessor determines an abnormal continuous optical output state being progressed regardless of burst-enable signals applied by the MAC module and takes required measures for resetting or blocking of the TX power when the detection signals are constantly released in a high level beyond over an allocated period of time.

9. The optical network terminal of claim 8, wherein the predetermined value has 10% of an average value of the detection currents output during initialization processes of the TX power.

10. A method of detecting a continuous optical output, recovering from failure and blocking a continuous optical output in an optical network terminal, comprising:
   releasing a burst-enable signal in a burst-on/off format from an MAC module;
   releasing an optical signal in a valid data format as a laser diode illuminates upon application of a bias voltage from the laser drive to the laser diode;
   providing a detection current from the continuous optical monitor photodiode in a start-up format by automatic phase control (APC) as the continuous optical monitor photodiode receives the optical signals when the laser diode illuminates; and
   releasing detection signals as a high value when the detection current has a level exceeding a predetermined value of an average current level (Monitor Photodiode Average Current), or as a low value when the detection current has a level not exceeding the predetermined value.

11. The method of claim 10, wherein the burst-on section is processed with polling in a predetermined cycle, and the microprocessor determines abnormal continuous optical outputs if the microprocessor can not recognize the low level as the detection signals maintain a high level regardless of the predetermined cycle.

12. The method of detecting, recovering and blocking continuous optical outputs of an optical network terminal of claim 11, wherein the predetermined value has 0.105 times the average current level released during initialization process of the laser diode.

13. The method of detecting, recovering and blocking continuous optical outputs of an optical network terminal of claim 10, wherein the burst-on section is processed with interruption, and the microprocessor determines abnormal continuous optical outputs if the microprocessor cannot detect a low level as the detection signals are maintained at a high level regardless of the interruption.

* * * * *